United States Patent [19]

Matsuda

[11] Patent Number: 5,129,713

[45] Date of Patent: Jul. 14, 1992

[54] ANTI-SKID BRAKE CONTROL SYSTEM WITH FAIL-SAFE SYSTEM RESPONSIVE TO ABNORMAL POWER SUPPLY

[75] Inventor: Toshiro Matsuda, Sagamihara, Japan

[73] Assignee: Nissan Motor Company, Limited, Yokohama, Japan

[21] Appl. No.: 610,005

[22] Filed: May 14, 1984

[30] Foreign Application Priority Data

May 17, 1983 [JP] Japan ................... 58-84905

[51] Int. Cl.$^5$ .......................................... B60T 17/22
[52] U.S. Cl. ................................ 303/92; 340/636
[58] Field of Search .............. 303/92, 20, 116, 119; 340/52 R, 52 B, 636; 188/181 C, 181 A

[56] References Cited

U.S. PATENT DOCUMENTS

| | | | |
|---|---|---|---|
| 3,861,760 | 1/1975 | Hamelin | 303/92 |
| 3,874,743 | 4/1975 | Fleischer et al. | 303/92 |
| 3,948,568 | 4/1976 | Leiber | 303/119 |
| 4,009,914 | 3/1977 | Sato et al. | 303/92 |
| 4,013,324 | 3/1977 | Quon | 303/92 |
| 4,049,325 | 9/1977 | Reinecke | 303/92 |
| 4,061,402 | 12/1977 | Peterson et al. | 303/92 |
| 4,421,361 | 12/1983 | Arikawa et al. | 303/92 |
| 4,425,622 | 1/1984 | Arikawa | 303/92 |

FOREIGN PATENT DOCUMENTS 0075931 3/1983 European Pat. Off. .............. 303/92

Primary Examiner—Alvin E. Oberley
Attorney, Agent, or Firm—Foley & Lardner

[57] ABSTRACT

A fail-safe system for an anti-skid brake control system includes a switch disposed within a power supply circuit of the anti-skid brake control system for connecting and disconnecting a vehicle battery to the anti-skid control system. A battery voltage monitor produces a disabling signal when the battery voltage drops below a predetermined battery voltage threshold. A gating circuit is disposed between the battery voltage monitor and the anti-skid control system to selectably transmit the disabling signal to the latter. The gating circuit receives as input the output of the anti-skid brake control system, and thus responds to operation of the anti-skid control system by blocking transmission of the disabling signal. Thus, the gating circuit allows the disabling signal to be transmitted to the anti-skid control system only while the anti-skid control system is inoperative. The switch disconnects the battery from the anti-skid control system in response to the disabling signal.

13 Claims, 3 Drawing Sheets

ANTI-SKID BRAKE CONTROL SYSTEM WITH FAIL-SAFE SYSTEM RESPONSIVE TO ABNORMAL POWER SUPPLY

BACKGROUND OF THE INVENTION

The present invention relates generally to an anti-skid brake control system for a wheeled vehicle for controlling braking pressure to be applied to a wheel cylinder or wheel cylinders in a hydraulic brake system. More particularly, the invention relates to a fail-safe system for an anti-skid control system which responds to abnormalities in the power supply to the anti-skid brake control system by performing a back-up operation.

In general, supply voltage for an anti-skid brake control system is regulated by a power regulator so as to be maintained at a constant voltage. The power regulator generally compensates for variations in the vehicle battery voltage and supplies a constant voltage to the electric or electronic circuit which, otherwise, might malfunction due to variations in the power supply voltage to the digital or analog ICs or the like.

Such power regulation circuitry has been disclosed in Published European Patent Application No. 0075931. In this disclosure, a fail-safe system in a power regulation circuit is provided for performing fail-safe operation even when the power regulation circuit is damaged and thereby the supply voltage from the regulation circuit varies significantly. The fail-safe system in the power regulation circuit includes a monitor power supply circuit independent of the power regulation circuit. The monitor power supply circuit is designed to produce a reference signal to be compared with the output of the power regulation circuit by a fail-safe circuit. The fail-safe circuit produces an error signal when the output signal value drops below a given threshold defined by the reference signal value to activate an alarm signal generator and disconnect an actuator controlled by the control system in order to prevent the actuator from malfunctioning due to malfunction of the control system.

In such power regulator circuitry, it is possible for the regulator circuit to detect a drop in the battery voltage below the given threshold during anti-skid brake control. For instance, relatively high power is required to operate an actuator which controls a pressure control valve for increasing, decreasing or holding constant the fluid pressure in a wheel cylinder. It may cause the battery voltage to drop below the given threshold briefly. Such power drop is only temporary, however and generally recovers shortly thereafter. However, in the aforementioned power regulator system in the prior art, fail-safe operation may be performed despite the anti-skid control operation state. Therefore, upon power drop due to actuation of the actuator during anti-skid brake control operation, the power source, i.e. vehicle battery, may be disconnected from the anti-skid brake control system, thus disabling the latter. Thus, after the fail-safe system becomes operative, anti-skid brake control is disabled, whereby the brake system applies fluid pressure to the wheel cylinders solely in accordance with depression of a brake pedal.

In such cases, the driver may apply an excessively high pressure to the brake pedal, relying on the anti-skid control system. Therefore, when the anti-skid control is disabled, the wheels may skid or lock, dangerously prolonging the braking distance.

SUMMARY OF THE INVENTION

Therefore, considering the above-mentioned drawback in the applicant's prior invention, it is an object of the present invention to provide a fail-safe system which is responsive to battery voltage below a given threshold to disable the anti-skid control, but which may not begin to operate while the anti-skid control is in operation.

Another and more specific object of the present invention is to provide a fail-safe system for an anti-skid brake control system, which is operative only when the latter is in the inoperative state detected by monitoring output of the latter.

In order to accomplish the above-mentioned and other objects, a fail-safe system for an anti-skid brake control system, according to the present invention, includes a switch disposed within a power supply circuit of the anti-skid brake control system for connecting and disconnecting a vehicle battery to the anti-skid control system. A battery voltage monitor produces a disabling signal when the battery voltage drops below a predetermined battery voltage threshold. A gating circuit is disposed between the battery voltage monitor and the anti-skid control system to selectably transmit the disabling signal to the latter. The gating circuit receives as input the output of the anti-skid brake control system, and thus responds to operation of the anti-skid control system by blocking transmission of the disabling signal. Thus, the gating circuit allows the disabling signal to be transmitted to the anti-skid control system only while the anti-skid control system is inoperative. The switch disconnects the battery from the anti-skid control system in response to the disabling signal.

In accordance with the preferred embodiment of the invention, a fail-safe system for an anti-skid automotive brake control system comprises a battery for supplying electric power to the anti-skid control system, a switch means disposed between the battery and the anti-skid control system, the switch means being operative between a first normal position for connecting the battery to the anti-skid control system and a second position for disconnecting the battery from the anti-skid control system, a first detector detecting when the battery voltage is out of a predetermined normal range to produce a first detector signal, a second detector for detecting braking of a vehicle to produce a second detector signal, and a power supply control means, responsive to the first detector signal to switch the position of the switch mean from the first position to the second position for disconnecting the battery from the anti-skid control system, the power supply control means being further responsive to the second detector signal for disabling the switching operation in response to the first detector signal as long as the second detector signal is present.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment, but are for explanation and understanding only.

In the drawings.

DESCRIPTION OF THE PREFERRED EMBODIMENTS

Figure 1:
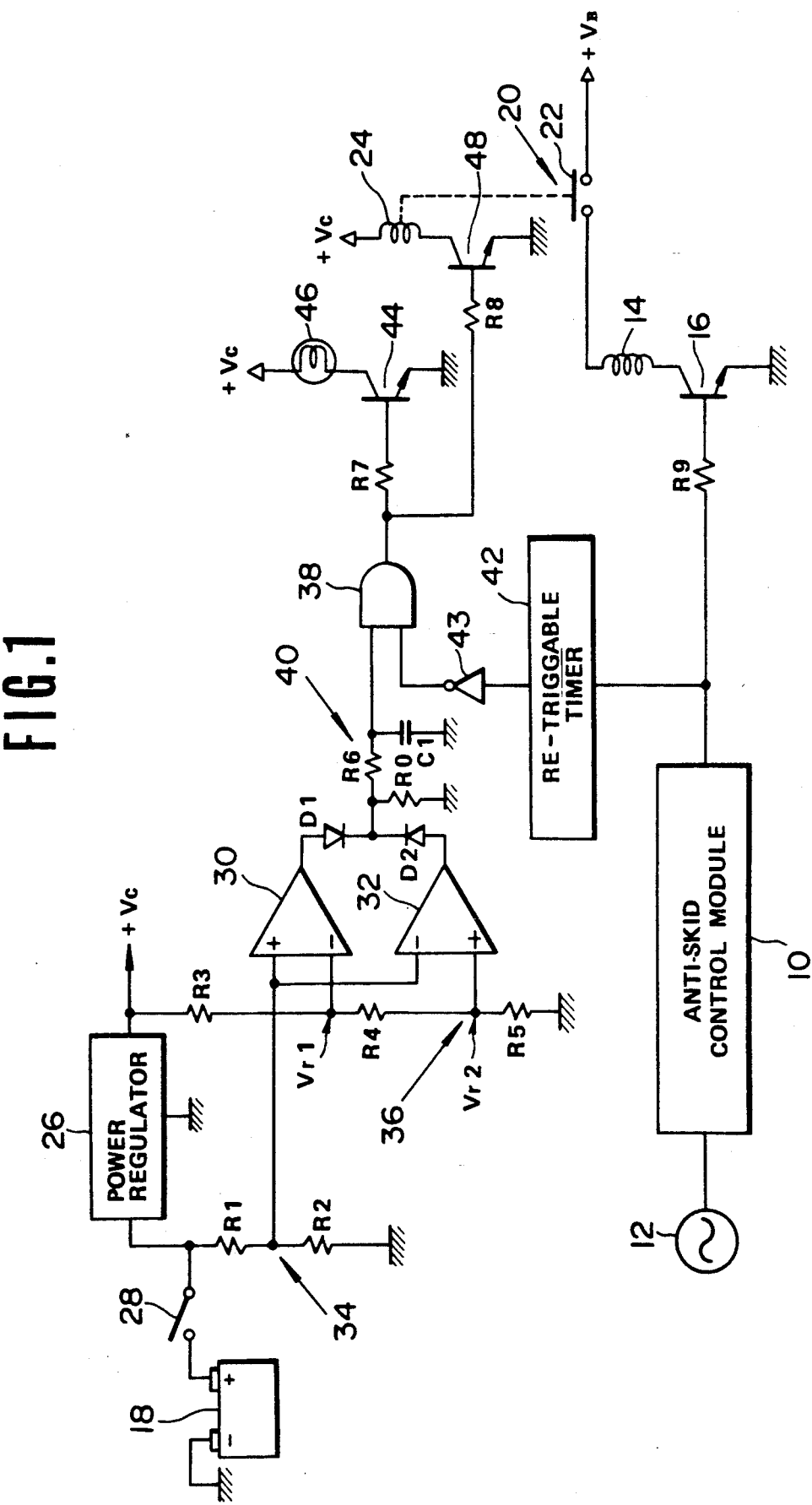
FIG. 1 is a circuit diagram of the first embodiment of a battery voltage responsive fail-safe system for an anti-skid brake control system according to the present invention.

Referring now to the drawings, particularly to FIG. 1, an anti-skid brake control module 10 is connected to a wheel speed sensor 12 adapted to produce an alternating current sensor signal with a frequency representative of the wheel speed. The anti-skid brake control module 10 processes the sensor signal to derive wheel speed, wheel acceleration, target wheel speed or projected vehicle speed, and slip rate of the wheel from the vehicle speed and so forth. Based on these derived control parameters, the control module 10 selects the appropriate operation mode of a hydraulic brake system (not shown) to increase (application mode), decrease (release mode) or to hold constant (hold mode) the fluid pressure in a wheel cylinder (not shown). In order to adjust the fluid pressure in the wheel cylinder, an electromagnetic fluid pressure control valve (not shown) is disposed in the hydraulic brake circuit, which is operative in response to a control signal from the control module. The electromagnetic valve includes an actuation solenoid 14 which controls the valve position of the electromagnetic valve according to which of the application, release and hold modes was selected.

In the embodiment shown, the control module 10 is connected to the solenoid 14 via a resistor R9 and a power transistor 16. Supply current for the solenoid is adjusted in relation to the operation mode selected by the control module. For example, when application mode is selected the solenoid is held inoperative by supplying no current at all. When the release mode is selected, a maximum current, e.g. 5A, supplied to fully energized the solenoid 14 and when the hold mode is selected, supply current for the solenoid is held at a limited value, e.g. 2A.

Such a control module 10 has been disclosed in U.S. Pat. No. 4,392,202, issued on Jul. 5, 1983 to the inventor and assigned to the assignee of this invention, U.S. Pat. No. 4,384,330, issued on May 17, 1983 to the same inventor and assigned to the same assignee, and U.S. Pat. No. 4,330,714, issued on Feb. 7, 1984 also to the same inventor and assigned to the same assignee. The contents of the above-identified U.S. Patents are hereby incorporated by reference.

The solenoid 14 is connected to a vehicle battery 18 acting as a power source via a relay switch 20 which includes a movable contact 22 and a relay coil 24. The relay coil 24 is, in turn, connected to a power regulator 26 which regulates battery voltage from the battery 18 supplied via an ignition switch 28.

The battery 18 is also connected to the positive input terminal of a HIGH-voltage detective comparator 30 and to the negative input terminal of a LOW-voltage-detective comparator 32 via the ignition switch 28 and a voltage divider 34 consisting of resistors R1 and R2.

The negative input terminal of the HIGH voltage detective comparator 30 is connected to the output terminal of the power regulator 26 via a voltage divider bridge consisting of resistor legs $R_3$ and $R4+R5$. On the other hand, the positive input terminal of the LOW-voltage-detective comparator 32 is connected to the output terminal of the power regulator 26 via a voltage divider consisting of the including resistor legs $R3+R4$ and R5. The first divided voltage Vr1 of the power regulator 26 serves as a HIGH-voltage-reference for the HIGH voltage detective comparator 30. The voltage Vr2 applied to the positive input terminal of the LOW-voltage-detective comparator similarly serves as a LOW voltage reference to be compared with the battery voltage applied to the negative input terminal via the voltage divider 34.

Therefore, the HIGH-voltage-detective comparator 30 outputs a HIGH-level comparator signal when the battery voltage applied to the positive input terminal via the divider 34 is higher than the HIGH voltage reference. Analogously, when the battery voltage applied via the divider 34 is lower than the LOW voltage reference, the LOW-voltage-detective comparator 32 outputs a HIGH-level comparator signal. The comparator signals of the comparators 30 and 32 are summed via diodes D1 and D2 and then applied to one input of an AND gate 38 via an integrator 40 consisting of a resistor R6 and a capacitor C1. The other input of the AND gate 38 is connected to the output terminal of the anti-skid brake control module 10 via a re-triggable timer 42, which is adapted to be triggered by a control signal of the control module demanding fluid pressure control in the release mode, and an inverter 43. Therefore, the AND gate 38 outputs a HIGH-level signal when it receives a HIGH-level signal from either of the comparators 30 and 32 while the re-triggable timer 42 is not triggered.

The output terminal of the AND gate is connected to the base electrode of a switching transistor 44 via a resistor R7. The transistor 44 is turned ON in response to a HIGH-level signal from the AND gate 38 to turn ON an alarm lamp 46. The output terminal of the AND gate 38 is also connected to the base electrode of a switching transistor 48 which is also turned ON in response to the HIGH-level signal from the AND gate 38. When the transistor 48 is turned on, the relay coil 24 connected to the collector electrode thereof is energized to drive the movable contact 22 so as to disconnect the solenoid 14 from the battery 18.

In operation, as long as the battery voltage remains within a predetermined normal range, the maximum and minimum voltages of which are respectively represented by the HIGH and LOW voltage references applied to the comparators 30 and 32, the comparator signals of the comparator 30 and 32 remain LOW. Therefore, the AND-gate output remains LOW to hold the switching transistors 44 and 48 in their nonconductive state. In this case, the relay coil 24 remains deenergized, and so connects the battery to the solenoid 14.

When battery voltage becomes abnormally HIGH, the comparator signal of the HIGH-voltage-detective comparator 30 goes HIGH. Therefore, the input level of the AND gate 38 from the comparator goes HIGH. If the control module 10 is currently performing anti-skid brake control, a control signal reflecting the release mode of the pressure control valve will be output in every high-frequency skid cycle. As set forth above, the re-triggable timer 42 is triggered each time the control signal demanding the release mode is output by the control module 10.

It should be noted that the duration for which the re-triggable timer 42 remains triggered is set longer than the longest possible duration of a skid cycle. Therefore, while the anti-skid control is being performed, the re-triggable timer 42 will remain triggered. The HIGH-level trigger signal is inverted by the inverter 43. As a result, the input to the AND gate 38 from the re-triggable timer 42 is LOW as long as the anti-skid brake control operation is being performed. The AND gate 38 is thus rendered non-conductive to keep the transistors 44 and 48 in their cut-off states.

When anti-skid brake control operation is not being performed or has ended, the control signal demanding release mode is not delivered to the re-triggable timer 42. Therefore, the re-triggable timer is not triggered, and so sends a LOW-level signal to the inverter 43. The inverter 43 responsive to the LOW-level signal by sending a HIGH-level signal to the AND gate. Since the HIGH-level signal currently applied to the other input terminal from one of the comparators 30 and 32, the AND gate opens to transmit a HIGH-level signal to the switching transistors 44 and 48 to turn the same ON. In response to turning ON of the switching transistors 44 and 48, the lamp 46 is turned ON to indicate the abnormality of the vehicle battery, and the relay coil 24 is energized to release the movable contact 22 from the stationary terminal, disconnecting the solenoid 14 from the vehicle battery 18. Thus, the solenoid 14 is prevented from shifting to the release mode or the hold mode and so is maintained in the application mode. Therefore, the hydraulic brake system is operated solely manually by adjusting the pressure applied to a brake pedal (not shown).

When the battery voltage drops so that the voltage applied to the LOW-voltage-detective comparator 32 drops below the LOW-voltage reference, substantially the same fail-safe operation will be carried out. In particular, the relay coil 22 is energized only when the anti-skid brake control is not being performed.

Figure 2:
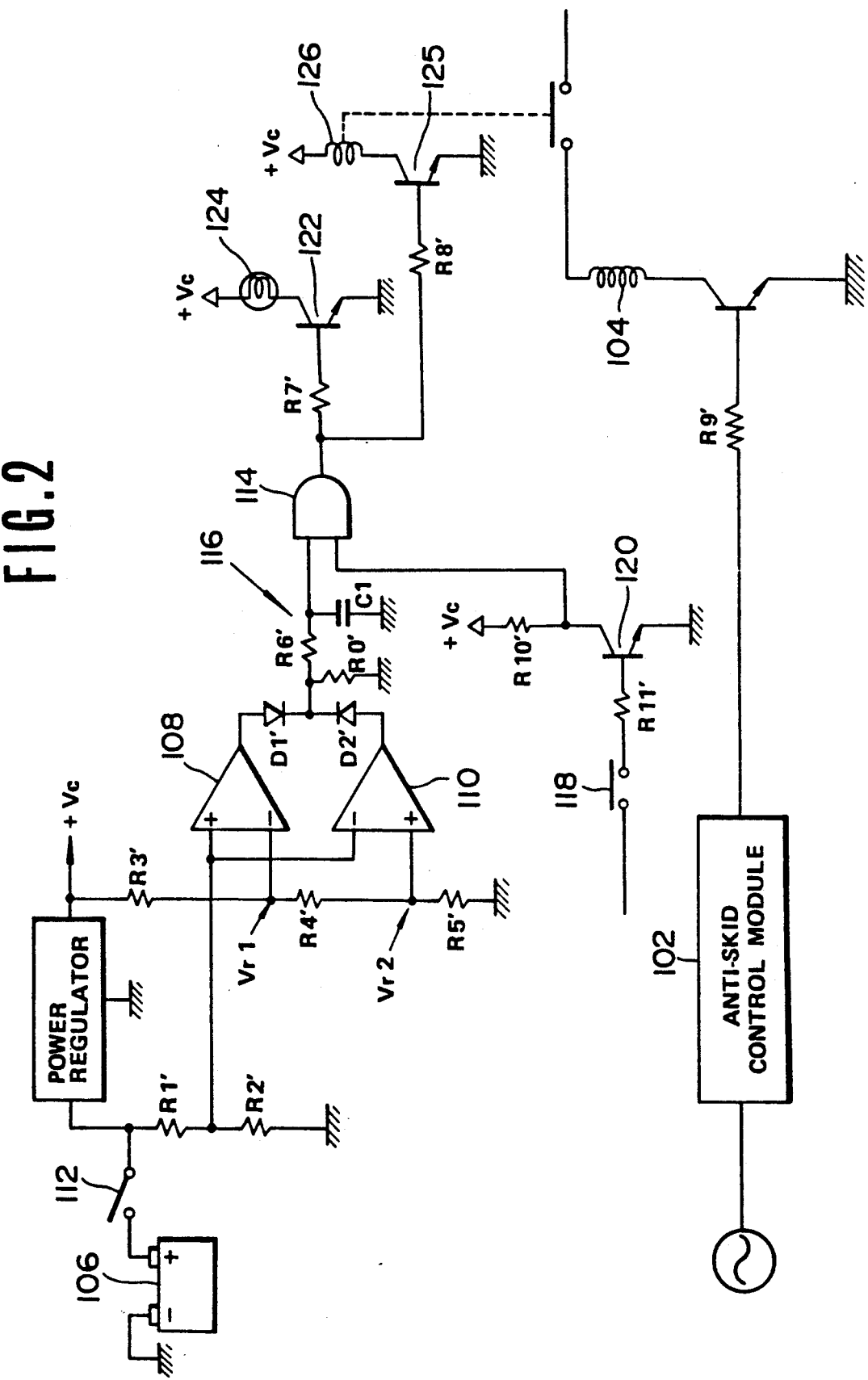
FIG. 2 is a circuit diagram of the second embodiment of a battery voltage responsive fail-safe system for an anti-skid brake control system according to the present invention.

FIG. 2 shows the second embodiment of the fail-safe system for an anti-skid brake control system according to the present invention. In this embodiment, the anti-skid brake control system comprises a wheel speed sensor 100, a control module 102 and a solenoid 104 (only the solenoid winding is shown), as in the aforementioned first embodiment. The vehicle battery 106 is connected to HIGH and LOW voltage detective comparators 108 and 110 via ignition switch 112. Reference signals representative of the HIGH and LOW voltage references are analogously applied to the HIGH-and LOW-voltage-detective comparators 108 and 110. The comparators 108 and 110 are connected to an AND gate 114 via an integrator 116.

The AND gate 114 is, in this embodiment, connected to a brake switch 118 via a transistor 120. The transistor 120 is responsive to depression of a brake pedal (not shown) to turn ON. When the transistor 120 is turned ON, the input to the AND gate from the transistor 20 goes LOW for as long as the brake switch remains on. When the brake pedal is released and thus the brake switch is turned OFF, the transistor 120 is cut off, resulting in a bias voltage at its collector electrode. The collector voltage is applied to the AND gate as a HIGH-level input.

In this case, when the battery voltage rises to an abnormally HIGH level or drops to an abnormally LOW level, one of the comparators 108 and 110 will output a HIGH-level comparator signal. In response to this HIGH-level comparator signal, the AND gate 114 is opened to send a HIGH-level signal to switching transistor 122 via a register R7' to turn the transistor ON. When the transistor 122 is turned on, an alarm lamp 124 is turned ON. In addition, in response to the HIGH-level signal, a transistor 125 turns ON to energize a relay coil 126 which then disconnects the solenoid 104 from the battery 106.

Figure 3:
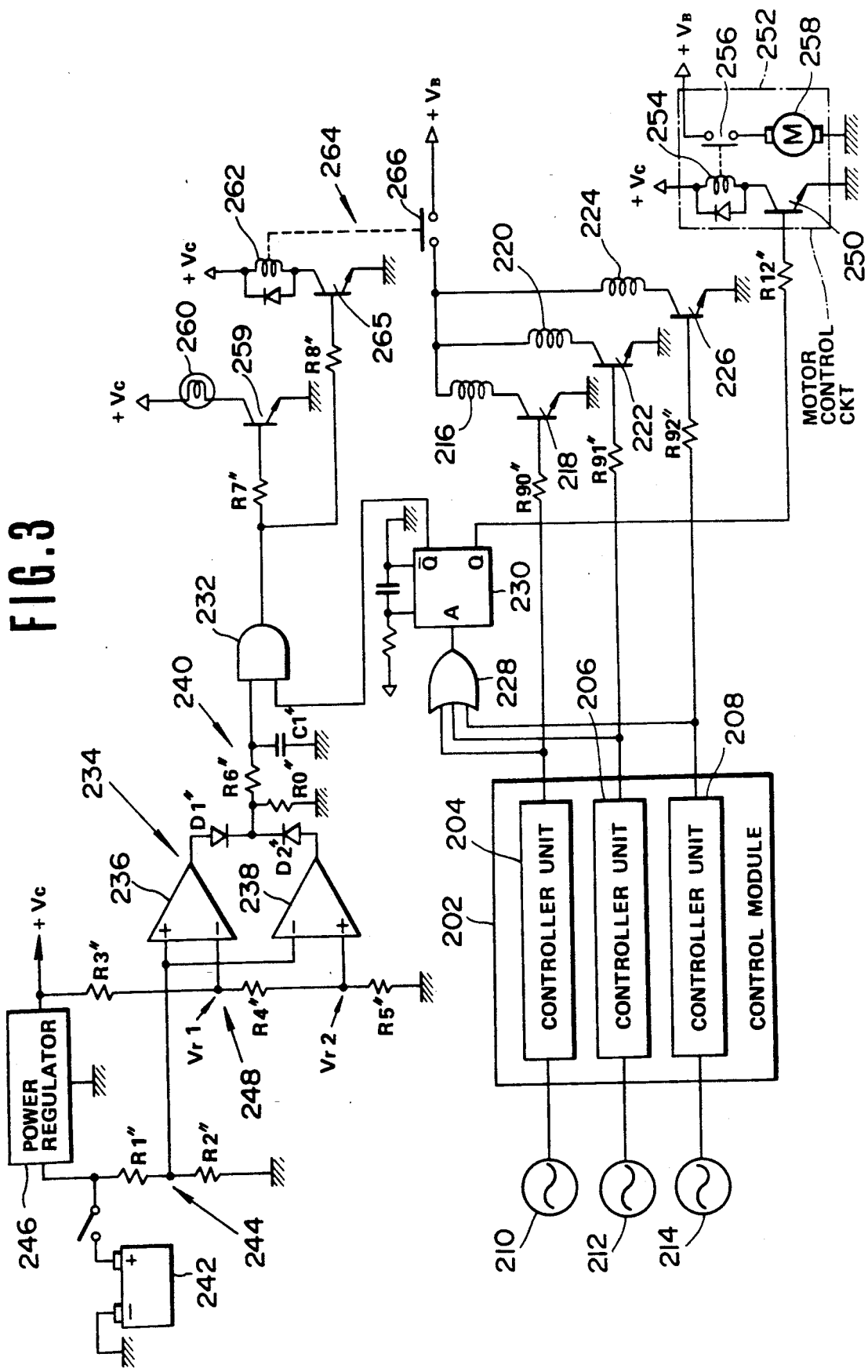
FIG. 3 is a circuit diagram of the third embodiment of a battery voltage responsive fail-safe system for an anti-skid brake control system according to the present invention.

FIG. 3 shows the third embodiment of the fail-safe system for an anti-skid brake control system according to the present invention. In this third embodiment, a control module 202 comprises three controller units 204, 206 and 208. The controller unit 204 is adapted to control brake fluid pressure in the front left wheel cylinder (not shown) for skid controlling the front left wheel. The controller unit 206 is adapted to control brake fluid pressure in the front right wheel cylinder (not shown) for skid controlling the front right wheel. Further, the controller unit 208 controls brake fluid pressure in the the rear wheel cylinders for skid-controlling the rear wheels. In order to perform anti-skid control independently of the other controller unit, each of the controller units 204, 206 and 208 is connected to corresponding wheel speed sensors 210, 212 and 214. The wheel speed sensors 210 and 212 are respectively located opposite front left and front right wheel hubs (not shown). The wheel speed sensor 214 is located opposite a differential gear housing to detect the average rotation speed of the left and right rear wheels.

The controller unit 204 is connected to the windings 216 of an electromagnetic actuator via a power transistor 218. The controller unit 206 is similarly connected to the windings 220 of an electromagnetic actuator (not shown) via a power transistor 222. Similarly, the controller unit 208 is connected to the windings 224 of an electromagnetic actuator (not shown) via a power transistor 226. The windings 216, 220 and 224 are designed to operate the corresponding electromagnetic actuators to operate corresponding pressure control valves in a hydraulic brake circuit to increase brake fluid pressure in the wheel cylinder in its application mode position, to decrease the braking pressure in its release mode position and to hold the braking pressure constant in its hold mode position. Each of the controller units 204, 206 and 208 controls the corresponding windings so as to actuate the corresponding pressure control valve to the one of the application mode position, release mode position and hold mode position depending upon braking condition of the corresponding wheel.

The controller units 204, 206 and 208 are further connected to an OR gate 228 which is, in turn, connected to input terminal A of a re-triggable timer 230. The negative output terminal Q of timer 230 is connected to one input terminal of an AND gate 232. The other input terminal of the AND gate is connected to a comparator circuit 234. The comparator circuit 234 comprises a pair of differential amplifiers 236 and 238 serving as the comparators and an integrator circuit 240. The differential amplifiers 236 and 238 are both connected to the vehicle battery 242 via voltage divider 244, one via its positive input terminal, the other via its negative input terminals. The other input terminals, i.e., the negative input terminal of the differential amplifier 236 and the positive input terminal of the differential amplifier 238, are connected to a power regulator 246 via a two-stage voltage divider 248 including resistors R3", R4" and R5".

The positive output terminal Q of timer 230 is connected to a switching transistor 250 in a fluid pump motor control circuit 252. The motor control circuit 252 comprises a switching relay including a relay coil 254 and a relay contact 256. The relay contact 256 is interposed in the power circuit of an electric motor 258 which drivies a fluid pump (not shown). The fluid pump is adapted to be driven when the pressure control valve is in the hold mode position or the release mode position to smoothly reduce the fluid pressure in the wheel cylinder when the release mode is selected.

The AND gate 232 is connected to a switching transistor 259 for turning ON and OFF an alarm indicator lamp 260, via a resistor R7". The AND gate 232 is further connected to a relay coil 262 of a switching relay 264 via a switching transistor 265. A relay contact 266 of the switching relay 264 is disposed within the power circuit for the electromagnetic actuators 216, 220, and 224.

As in the aforementioned embodiments, the input level to the AND gate 232 from the comparator circuit 234 goes HIGH when the battery voltage increases or drops beyond upper and lower limits of the allowable voltage range. When the anti-skid brake control system is operating in the release mode or hold mode and therefore, at least one of the controller units 204, 206 and 208 is outputting a control signal reflecting the release or hold mode, the retriggable timer 230 is triggered to drop the input level of the AND gate 232 to LOW level. Therefore, the AND gate 232 is rendered non-conductive, thus ensuring power supply to the windings 216, 220 and 224. At the same time, a HIGH-level output from the positive output terminal Q of timer 230 is fed to the base electrode of the switching transistor 250 to turn the latter ON. When the transistor 250 is turned on, the relay coil 254 is energized to turn ON the relay switch 256 to drive the electric motor 258.

On the other hand, when the anti-skid brake control system is inoperative or is operating in the application mode, and thus none of the controller units 204, 206 and 208 is outputting a control signal reflecting the release or hold mode, the retriggable timer 230 is not triggered, and so a HIGH-level output to the AND gate 232 through the negative output terminal thereof. Therefore, together with the HIGH level input from the comparator circuit 234, the AND gate 232 is opened to supply HIGH-level outputs to the switching transistors 259 and 265 to turn them ON. As a result, the alarm indicator lamp 260 is turned ON to provide an alarm. The relay coil 262 is also energized to turn the relay switch 266 OFF and thus cut power supply to the windings 216, 220 and 224. Thus, the pressure control valves operated by the winding are held in application mode, mandating manual braking.

When none of the controller units 204, 206 and 208 is outputting a control signal calling for the release or hold mode, the switching transistor 250 is cut off, leaving the relay coil deenergized and so leaving the relay switch 256 OFF. In this relay switch position, power supply to the electric motor is thus cut, rendering the fluid pump inoperative.

According to the third embodiment as set forth above, the fail-safe system also controls the operation of the pressure reduction fluid pump.

Therefore, in accordance with the present invention, the fail-safe operation for disabling the fluid pressure control solenoid will not be performed as long as the anti-skid control is operating even when the battery voltage becomes abnormally HIGH or LOW.

Thus, the present invention fulfills all of the objects and advantages sought therefor.

What is claimed is:

1. A fail-safe system for an anti-skid automotive brake control system comprising:
    a battery for supplying electric power to said anti-ski control system;
    a switch means disposed between said battery and said anti-skid control system, said switch means being operative between a first normal position for connecting said battery to said anti-skid control system and a second position for disconnecting the battery from said anti-skid control system;
    a first detector detecting when the battery voltage is out of a predetermined normal range to produce a first detector signal;
    a second detector for detecting braking of a vehicle to produce a second detector signal; and
    a power supply control means, responsive to said first detector signal and the absence of said second detector signal for switching the position of said switch means from said first position to said second position for disconnecting said battery from said anti-skid control system for disabling the latter, said power supply control means being further responsive to said second detector signal for disabling said switching operation in response to said first detector signal for maintaining connection between said battery and said anti-skid control system in order to enable said anti-skid control system irrespective of said first detector signal as long as said second detector signal is present, whereby battery voltages outside of said predetermined normal range which occur during braking are prevented from disconnecting said anti-skid control system from said battery, thereby maintaining said anti-skid control system operative.

2. The fail-safe system as set forth in claim 1, wherein said second detector detects a control signal produced by said anti-skid control system demanding a decrease in the fluid pressure in a hydraulic brake system.

3. The fail-safe system as set forth in claim 1, wherein said second detector comprises a brake switch closed whenever braking is being performed.

4. The fail-safe system as set forth in claim 2, wherein said anti-skid brake control system comprises a wheel speed sensor for detecting wheel speed, a control module for processing a signal from said wheel speed sensor and producing a control signal for increasing, decreasing and holding constant the fluid pressure in said hydraulic brake system so as to optimize braking characteristics, and an electromagnetic actuator associated with said hydraulic brake system for increasing, decreasing and holding constant the fluid pressure in response to said control signal.

5. The fail-safe system as set forth in claim 3, wherein said anti-skid brake control system comprises a wheel speed sensor for detecting wheel speed, a control module for processing a signal from said wheel speed sensor and producing a control signal for increasing, decreasing and holding constant the fluid pressure in said hydraulic brake system so as to optimize braking characteristics, and an electromagnetic actuator associated with a hydraulic brake system for increasing, decreasing and holding constant the fluid pressure of said hydraulic brake system in response to said control signal.

6. The fail-safe system as set forth in claim 4, wherein said electromagnetic actuator is connected to said battery via said switch means, and said switch means connects and disconnects said actuator to and from said battery.

7. The fail-safe system as set forth in claim 5, wherein said electromagnetic actuator is connected to said battery via said switch means, and said switch means connects and disconnects said actuator to and from said battery.

8. The fail-safe system as set forth in claim 6, which further comprises means responsive to switching of said switch position from said first position to said second position for producing an alarm.

9. The fail-safe system as set forth in claim 7, which further comprises means responsive to switching of said switch position from said first position to said second position for producing an alarm.

10. The fail-safe system as set forth in claim 8, which further comprises a motor control circuit for controlling operation of a fluid pump motor for reducing fluid pressure, said motor control circuit being associated with said anti-skid control system to operate said motor when said anti-skid control system is operating.

11. The fail-safe system as set forth in claim 10, wherein said motor control circuit is responsive to said second detector signal to operate said motor.

12. An anti-skid brake control system with a fail-safe system comprising:

an anti-skid controller associated with sensors for detecting a vehicular braking condition and controlling application and releasing of braking pressure for a wheel cylinder of a vehicular brake system;

a hydraulic brake circuit incorporating an anti-skid controlling actuator for controlling braking pressure in said wheel cylinder upon detection of a control signal from said anti-skid controller;

a fluid pump disposed within the braking circuit and adapted for circulating the working fluid in said wheel cylinder to an accumulator in a brake circuit for reducing braking pressure in said wheel cylinder, which fluid pump becomes active at least in the brake releasing mode operation state of said actuator;

a vehicular battery supplying electric power for said actuator and said fluid pump for operation thereof;

a switch means disposed between said battery and said actuator and operable between a conductive state for establishing electrical communication between said battery and said actuator and a non-conductive state for blocking electrical communication between the battery and said actuator in order to place said actuator in an operational state in an application mode;

a first detector monitoring voltage of said battery and producing a first signal when the battery voltage is not within a predetermined normal range;

a second detector for detecting a vehicular braking state and producing a second detector signal upon application of a vehicle brake; and a power supply controller responsive to said first signal in the absence of said second detector signal to operate said switch means from said conductive state to said non-conductive state for disabling said anti-skid controlling actuator, and responsive to said second detector signal to maintain said switch means at said conductive state as long as said second detector signal is present, whereby said switch means is prevented from erroneously shutting off the power supply to said actuator in response to a temporary drop of the battery voltage due to actuation of said actuator and/or said fluid pump.

13. An anti-skid brake control system with a fail-safe system therefor comprising:

a hydraulic brake circuit including a fluid pressure source and a wheel cylinder for building up therein a braking pressure;

a pressure control valve means for adjusting braking pressure in said wheel cylinder, said pressure control valve means being movable between a first position to increase said braking pressure in said wheel cylinder in response to a braking operation and a second position to decrease said braking pressure in said wheel cylinder;

an actuator, associated with said pressure control valve means, for operating said pressure control valve means between said first and second positions;

a battery for supplying electric power to said anti-skid control system;

a switch means disposed between said battery and said anti-skid control system, said switch means being operative between a first normal position for connecting said battery to said anti-skid control system and a second position for disconnecting the battery from said anti-skid control system;

a first detector detecting when that battery voltage is out of a predetermined normal range to produce a first detector signal;

a second detector for detecting braking of said vehicle to produce a second detector signal; and a power supply control means, responsive to said first detector signal for switching the position of said switch means from said first position to said second position for disconnecting said battery from said anti-skid control system for disabling the latter and for operating said actuator to operate said pressure control valve means at said first position so as to allow adjustment of braking pressure directly responsive to said braking operation, said power supply control means being further responsive to said second detector signal for disabling said switching in response to said first detector signal for maintaining connection between said battery and said anti-skid control system in order to enable said anti-skid control system irrespective of said first detector signal as long as said second detector signal is present.

* * * * *